Feb. 7, 1956  E. W. DOLAMORE  2,734,178
LIGHT BULB SOCKET ASSEMBLY
Filed June 23, 1951  2 Sheets-Sheet 1
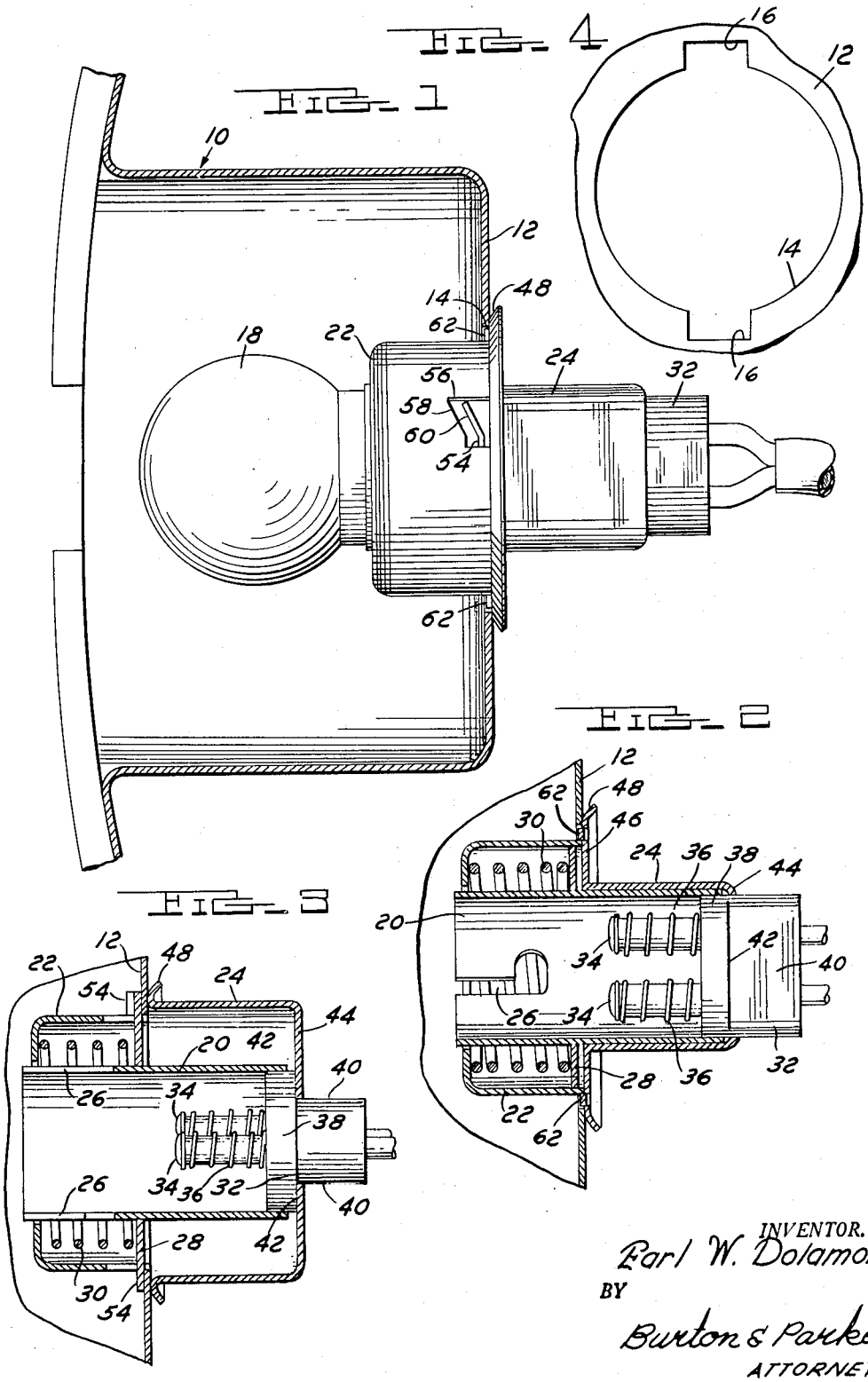
INVENTOR.
Earl W. Dolamore
BY
Burton & Parker
ATTORNEYS Feb. 7, 1956    E. W. DOLAMORE    2,734,178
LIGHT BULB SOCKET ASSEMBLY
Filed June 23, 1951    2 Sheets-Sheet 2
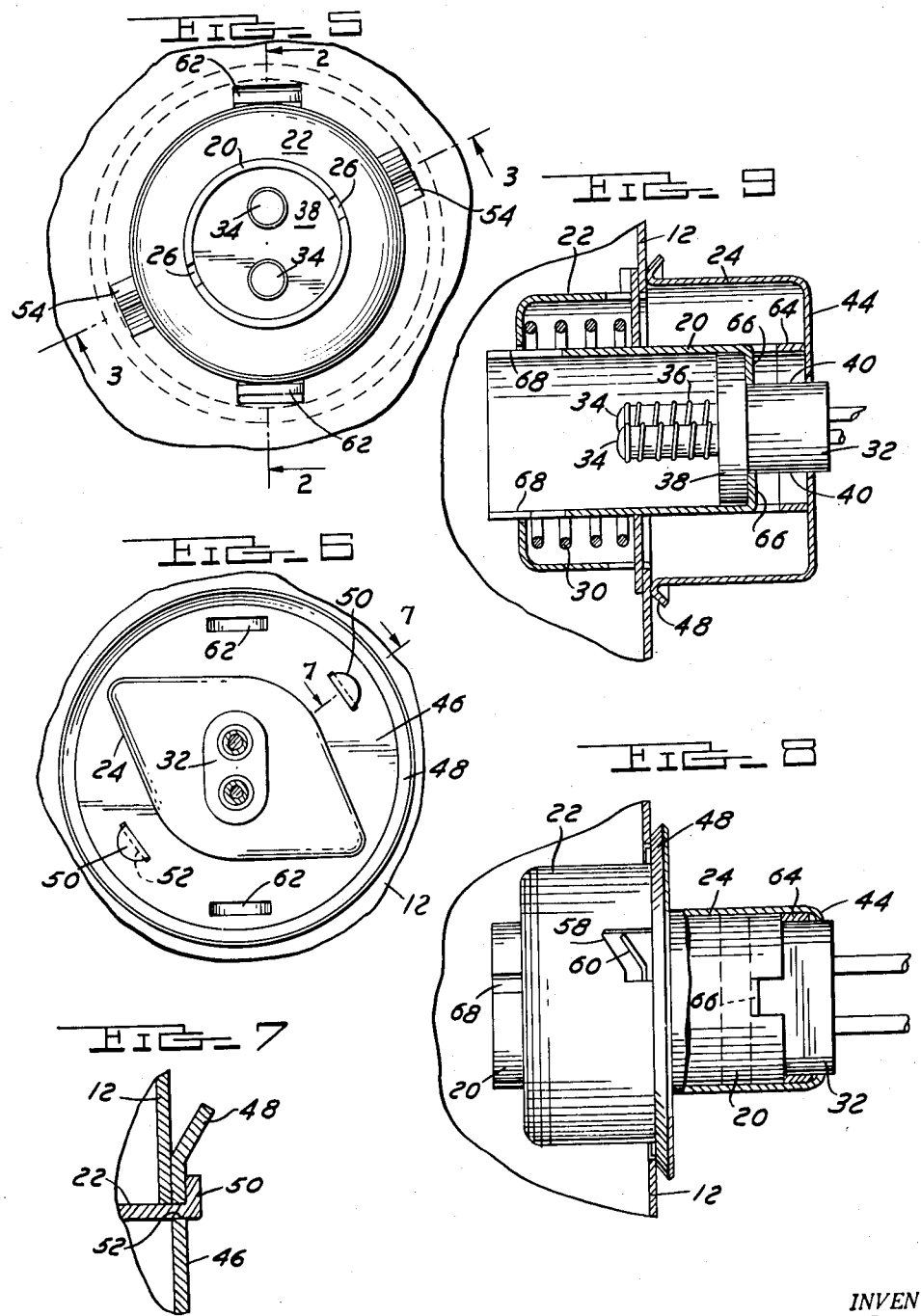
INVENTOR.
Earl W. Dolamore
BY
Burton & Parker
ATTORNEYS

United States Patent Office 2,734,178
Patented Feb. 7, 1956

2,734,178

LIGHT BULB SOCKET ASSEMBLY

Earl W. Dolamore, Birmingham, Mich., assignor to Watts Electric & Mfg. Co., Birmingham, Mich., a corporation of Michigan Application June 23, 1951, Serial No. 233,230

3 Claims. (Cl. 339—127)

This invention relates to socket assemblies and particularly to an improved light bulb socket adapted for quick attachment and use in exposed positions such as on motor vehicles or the like.

The invention is particularly adapted for use in tail light assembles on motor vehicles and as is well understood such parts of an automobile are relatively exposed and subjected to varying weather conditions and foreign matter thrown up by the wheels when the vehicle is under way. The wall portions of automobile tail light housings through which the light bulb sockets extend are usually located on the underside of the vehicles where they are relatively inaccessible and become encrusted with matter thrown up by the wheels. This has rendered it difficult to inspect, repair and replace the tail light bulbs and their sockets. Although the present invention is particularly designed for use in automobile tail light assemblies it is understood that it is applicable to other forms of mountings.

An important object of the invention is to provide an improved light bulb socket assembly which is especially designed for quick attachment and detachment and is so constructed that it may be readily installed regardless of any minor irregularity in the construction of the housing and that when mounted in place the socket is held in non-rattling condition. Another important object of the invention is to provide a sturdily constructed, long-lasting socket for use in exposed conditions and particularly in tail light assemblies of motor vehicles. A further important object of the invention is to provide an improved socket structure composed of a minimum number of parts capable of fabrication at low cost and adapted for convenient and rapid assembly.

In carrying out the invention, the socket assembly includes an inner sleeve or tube opened and shaped at one end to detachably receive a light bulb. The sleeve is substantially completely enclosed by two surrounding members which are axially spaced apart on the sleeve. One of these members is in the form of a collar or retainer encircling the bulb receiving end of a sleeve and the other member is in the form of a body or casing encircling the outer exposed end of the sleeve. In the mounted position of the socket the sleeve extends through an aperture in the supporting wall or panel of a housing with the collar located on the inside of the housing and a casing on the outside thereof. Disposed within the collar in encircling relation to the sleeve is a novel ring-shaped member which is spring pressed toward the outer end of the sleeve and has a limited floating travel axially of the sleeve. Carried by the member in laterally projecting relation are tongue-shaped elements extending through the wall of the collar and capable of a sliding, wedging movement along the inside marginal portion of the aperture through which the socket extends. These tongue elements function to releasably lock the socket to the wall or the panel in which it is mounted. The floating movement of the ring-shaped member enables the tongue elements to accommodate themselves to any irregularity in the surface contour of the housing wall or panel and eliminates the need for precise fabrication of the housing or other supporting wall in which the socket is mounted.

An important feature of the invention is the construction of the socket such that it may be inserted into the aperture of a socket wall or a panel by a straight line movement which is followed by a turn on its axis to lock the socket in place. After the socket is mounted, it may be easily detached from the supporting wall or panel by a simple partial turn on its axis. To facilitate the turning movement of the socket, the body or casing surrounding the outer end of the sleeve is preferably shaped in a non-circular formation. Another feature of the invention is the provision for releasably holding the socket in final assembled position in the supporting wall or panel and yet permit a turning movement in either direction to quickly detach the socket from the wall for the purpose of inspection, repair or replacement. Another feature of the invention is the manner of interiorly supporting and insulating an electric contact body or core having one or more yieldable contacts with which the terminal end of a light bulb is engageable.

Various other objects, advantages and meritorious features of the invention will become more fully apparent from the following specification, appended claims and accompanying drawings, wherein:

Fig. 1 is a cross sectional view through an automobile tail light housing illustrating the light bulb socket in assembled position therein, Fig. 2 is a longitudinal sectional view through the socket taken along line 2—2 of Fig. 5 and showing the socket in mounted position in the wall of the housing.

Fig. 3 is a longitudinal sectional view through the socket taken along line 3—3 of Fig. 5 and showing the entire construction on a plane approximately 60° to that of Fig. 2.

Fig. 4 is a view of the opening in the panel for receiving the socket assembly,

Fig. 5 is a view of the inner bulb end of the socket but with the bulb removed,

Fig. 6 is a view of the opposite outer end of the socket,

Fig. 7 is an enlarged detailed sectional view taken along line 7—7 of Fig. 6,

Fig. 8 is a side view, partly in section, showing a modification of the socket, and Fig. 9 is a longitudinal sectional view of the modified socket construction taken on a plane approximately 60° to that of Fig. 7.

Referring particularly to the drawings, a tail light housing of a motor vehicle is generally indicated at 10 in Fig. 1 and includes a back wall or panel 12. The latter is provided with an aperture 14 through which the socket assembly extends and includes two diametrically opposed notches or recesses 16—16. The forward or light emitting side of the housing 10 is shaped in any suitable manner for connection to the rear body portion of a motor vehicle and a transparent member (not shown) is utilized to cover the opening in the housing through which the tail light shows, as in conventional practice.

The socket assembly comprises in general a light bulb 18 of conventional formation, a sleeve or tube 20, shown in Figures 2 and 3, into the inner opened end of which the terminal portion of the light bulb is received, a cup-shaped member or collar 22 serving as a spring retainer and encircling the inner end of the tube 20, and a second member or body portion 24 in the form of a casing encircling the outer end section of the tube. The tube 20 is longer than either the collar 22 or the casing 24 and in properly mounted position in the supporting wall or panel 12 extends approximately equal distances from either side thereof. The collar 22 encircles the tube on the inside of the housing wall 12 and the casing 24 encircles the tube on the outside of the wall. The inner end of the tube 20 is provided with conventional bayonet or J-slots 26 which are located diametrically opposite to one another and serve to receive projections on the terminal end of the bulb to releasably lock the same in the tube. The assembly is completed by the provision of an annularly shaped member or retainer ring 28 which encircles the tube 20 intermediate its ends and the further provision of a coil spring 30 which surrounds the inner section of the tube 20 and is seated at one end on the retainer ring 28 and at the opposite end on the outer end of the cup-shaped member 22.

Received in the outer end section of the tube 20 is a body or core 32 of insulating material which carries one or two depressible contact elements 34. These contact elements project toward the light bulb and when the latter is mounted in the tube 20 engage the base or terminal end thereof to deliver electrical current thereto. Surrounding each contact element is a coiled spring 36 which is seated at one end in a recess of the core, as shown in Fig. 2, and is seated at the other end against a lip formed on the outer extremity of the element which it encircles. Each spring 36 yieldingly urges its respective contact element forwardly in the direction of the light bulb for contact therewith. The two contact elements are reciprocatingly mounted in passages in the core 32 and the core received end of each contact element may be flared outwardly to form a lip which engages an internal shoulder in the passage to limit its outward projection.

The inner end of the core 32 is cylindrically shaped to fit the interior of the tube 20, as indicated at 38. The balance of the core body is reduced in thickness and provided with two oppositely disposed flat sides 40—40. The two flat sides cooperate with the cylindrical end section 38 to form shoulders 42. The outer end of the casing 24 is inwardly bent as at 44 to form an abutment against which the shoulders 42 bear to thereby prevent the core from pulling out of the socket. The inwardly bent end 44 also serves as an abutment for the tube 20 limiting its movement in that direction.

The body portion or casing 24 is provided with a radial flange 46 which in the mounted position of the parts abuts the outside surface of the wall or panel 12. The peripheral edge of the flange may be turned slightly back, as shown at 48. The collar 22 is interlocked with the flange 46 to secure the parts of the socket into a unitary assembly. For this purpose, as shown in Figs. 5 and 6, the collar is provided with two or more small extensions or tangs 50—50 formed integrally with the collar and which project from the inner edge of the collar. In assembling the parts, the tangs are passed through narrow slots 52 formed in the radial flange 46 and are thereafter bent substantially perpendicularly to their original position to clamp the collar to the casing member 24. In this manner, the collar and casing are joined together and hold the remaining parts therewithin.

Carried by the retainer ring 28 are two tongue-shaped elements 54—54 which project laterally from the retainer and through the wall of the cup-shaped member or collar 22 for engagement with the inner surface of the wall or panel 12. For this purpose, the collar 22 is provided with openings 56 of the shape and formation shown in Fig. 1. These openings are preferably provided with parallel side walls terminating in an end wall having an inclined edge 58. The dimensions of the side walls of the opening are greater than the thickness of the tongues 54 in order to provide a limited axial travel or floating movement of the retainer ring relative to the tube 20. The coil spring 30 yieldingly urges the retainer ring toward the center of the tube and in the mounted position of the socket presses the tongues against the inner surface of the wall 12, as clearly evident in Fig. 3. One side of each tongue 54 is inclined to the plane of the ring 28, as shown at 60, to facilitate sliding movement of the tongues over the inner surface of the wall or panel 12.

Struck up from the radial flange 46 are two lands or ridges 62. These ridges project toward the inner end of the tube, as shown in Fig. 2, and are disposed diametrically opposite to one another and in angular offset relation to the tongues 54—54. In the final mounted position of the socket in the housing wall 12 the ridges extend into the notches or recesses 16—16 of the aperture 14. In this manner, the socket assembly is releasably locked in the housing wall.

The tongues 54—54 of the retainer ring 36 are of such a size that they may be passed through the notches 16—16 of the aperture 14. When mounting the socket assembly in place on the housing wall 12, it is first inserted by a straight line movement through the aperture 14 with the tongues 54—54 passing through the notches 16—16. After the tongues have been passed through the notches, at which time the flange 46 will abut the outside surface of the housing wall 12, the socket assembly is given a turn about its axis in the direction of the slanting sides of the tongues to bring the ridges 62—62 into the notches. During the turning movement of the socket, the tongues 54—54 of the retainer ring shift out of the notches and ride over the inner surface of the wall 12 while being yieldingly pressed against the wall by the coiled spring 30. Since the tongues bear on the inner surface of the wall 12, the spring 30 forces the assembly, including the tube 20 and the casing 24, inwardly thus bringing the flange 46 against the outer face of the wall 12 with the ridges 62 fully received in the notches 16. In this manner, the assembly is mounted in the wall housing and cannot be retracted therefrom unless force is applied to turn the socket assembly to bring the tongues in alignment with the recesses 16.

To facilitate turning movement of the socket assembly, it is preferred to shape the body or casing 24 into a non-circular formation. During the mounting and dismounting of the socket, it is this part of the socket which is grasped by the fingers of the hand. As shown in Fig. 6, it is preferred to shape the casing into the diamond formation illustrated, although it is understood it may be otherwise designed to facilitate handling and turning movement thereof.

Figs. 8 and 9 illustrate a modification of the invention. The arrangement of the parts of the socket is substantially the same as the embodiment of the invention hereinabove described except for a change in the mounting and location of the insulating core carrying and depressible contact elements. All the parts of the modified structure corresponding to the parts described in the socket of Figs. 1 to 7 are referred to by the same reference numerals. Since the core and its contact elements remain unchanged they are likewise referred to by the same reference numerals.

Referring particularly to Figs. 8 and 9, it is noted that the insulating body or core 32 is mounted in the tube 20 in closer relation to the plane of the back wall 12 of the housing than in the previously described structure. This brings the core substantially wholly within the casing 24 with very little, if any, part thereof projecting beyond the outer end of the casing. The inner end of the tube 20 projects further into the housing. This is accomplished by providing a spacer in the form of a ring 64 which is interposed between the outer end of the tube 20 and the inwardly bent end wall 44 of the casing 24. Struck out of the material of the tube 20 and radially inwardly bent therefrom are a pair of oppositely disposed flanges or tongues 66—66 which extend in under the shoulder 42 of the core 32 and form a rest upon which the cylindrical portion 38 of the core bears. The tongues have a radial extent such that their inner free ends substantially abut the opposite flat sides 40—40 of the core. In this manner, the core 32 is supported in closer relation to the inner end of the tube 20 and the latter is projected further into the housing 10. This is a desirable form of mounting in certain types of automobile tail light assemblies. The bayonet or J-slots 68 of the modified structure may be slightly shorter in length than the J-slots 26 of the previously described socket, as shown by a comparison of Figs. 3 and 9.

What I claim is:

1. A light bulb socket assembly comprising a tubular sleeve having a contact carrying core mounted therein, a casing carried by the rear end of said sleeve, said casing at its forward end having a radially outwardly extending flange, a radially enlarged collar surrounding the forward end of said sleeve, said collar having a cylindrical side wall provided at its forward end with a radially inwardly extending flange consitituting a spring seat, the rear end of said collar having means rigidly securing it to the radially outwardly extending flange of said casing, a retainer ring movable axially on the forward end of said sleeve between the radially outwardly extending flange of said casing and the radially inwardly extending flange at the forward end of said collar, a coil compression spring surrounding said sleeve within said collar and seated at its forward end against said radially inwardly extending flange and at its rear end engaging the forward face of said retainer ring, said collar having openings through its side walls, tongues on the outer edges of said retainer ring extending radially outwardly through said openings, said collar being rotatable by said casing, and said tongues being engageable by the sides of said openings to effect positive rotation of said retainer ring when said collar is rotated.

2. An assembly as defined in claim 1 in which the radially outwardly extending flange at the forward end of said casing has forwardly extending abutments spaced circumferentially from said tongues.

3. A light bulb socket assembly comprising a tubular sleeve having a contact carrying core at one end and being open at the other end to receive the base of a light bulb, a fixed mounting flange extending radially outwardly from said sleeve intermediate its ends, a collar fixed to said flange and extending forwardly therefrom, said collar having oppositely disposed openings adjacent said flange, a retainer ring in said collar having radially extending tongues projecting outwardly through said openings, spring means in said collar engaging said ring and urging said ring toward said flange, said collar being rotatable by said sleeve and flange, and said tongues being engageable by the sides of said openings to effect positive rotation of said retainer ring when said sleeve and flange are rotated.

References Cited in the file of this patent
UNITED STATES PATENTS

| | | |
|---|---|---|
| 2,278,385 | Watts | Mar. 31, 1942 |
| 2,357,955 | Johnson | Sept. 12, 1944 |
| 2,360,809 | Wood | Oct. 17, 1944 |
| 2,572,813 | Murphy | Oct. 23, 1951 |
| 2,638,575 | Winkelmeyer et al. | May 12, 1953 |